United States Patent [19]

Welch

[11] 4,063,659
[45] Dec. 20, 1977

[54] CAR TOP BOAT CARRIER

[76] Inventor: Gerald J. Welch, 5 Brentwood Road, New Milford, Conn. 06776

[21] Appl. No.: 746,693

[22] Filed: Dec. 2, 1976

[51] Int. Cl.² .............................................. B60R 9/00
[52] U.S. Cl. ..................................... 214/450; 193/38; 214/85; 224/42.1 H
[58] Field of Search ................. 224/42.1 H, 42.1 D, 224/42.1 F, 42.1 E; 214/450, 85, 85.1; 193/38, 41

[56] References Cited
U.S. PATENT DOCUMENTS

| | | | |
|---|---|---|---|
| 1,024,828 | 4/1912 | Candee | 193/41 |
| 3,001,679 | 9/1961 | Canning et al. | 224/42.1 F |
| 3,679,080 | 7/1972 | Fulcher | 214/450 |
| 3,750,812 | 8/1973 | Evans | 214/450 |

FOREIGN PATENT DOCUMENTS 855,559  11/1970  Canada .................................. 214/450

Primary Examiner—Robert J. Spar
Assistant Examiner—Ross Weaver
Attorney, Agent, or Firm—Buckles and Bramblett

[57] ABSTRACT

A readily mountable and demountable car top boat carrier. The carrier includes a cradle portion on the car top which carries a boat secured thereto and a ramp comprising a pair of folding rails which extend downwardly from the car top cradle when unfolded to permit a boat to be easily slid between the cradle and the water surface by a single person. The rails are individually adjustable for differences in bottom depth and fold into a compact storage position when not in use.

8 Claims, 10 Drawing Figures

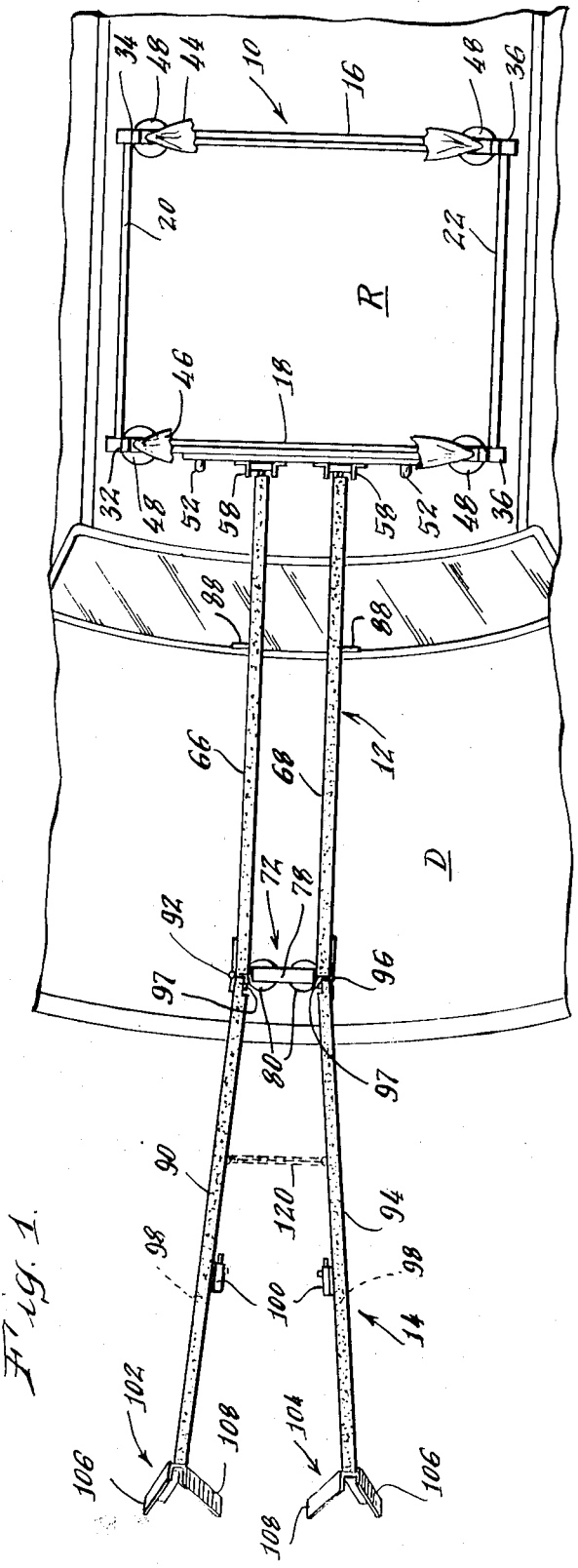

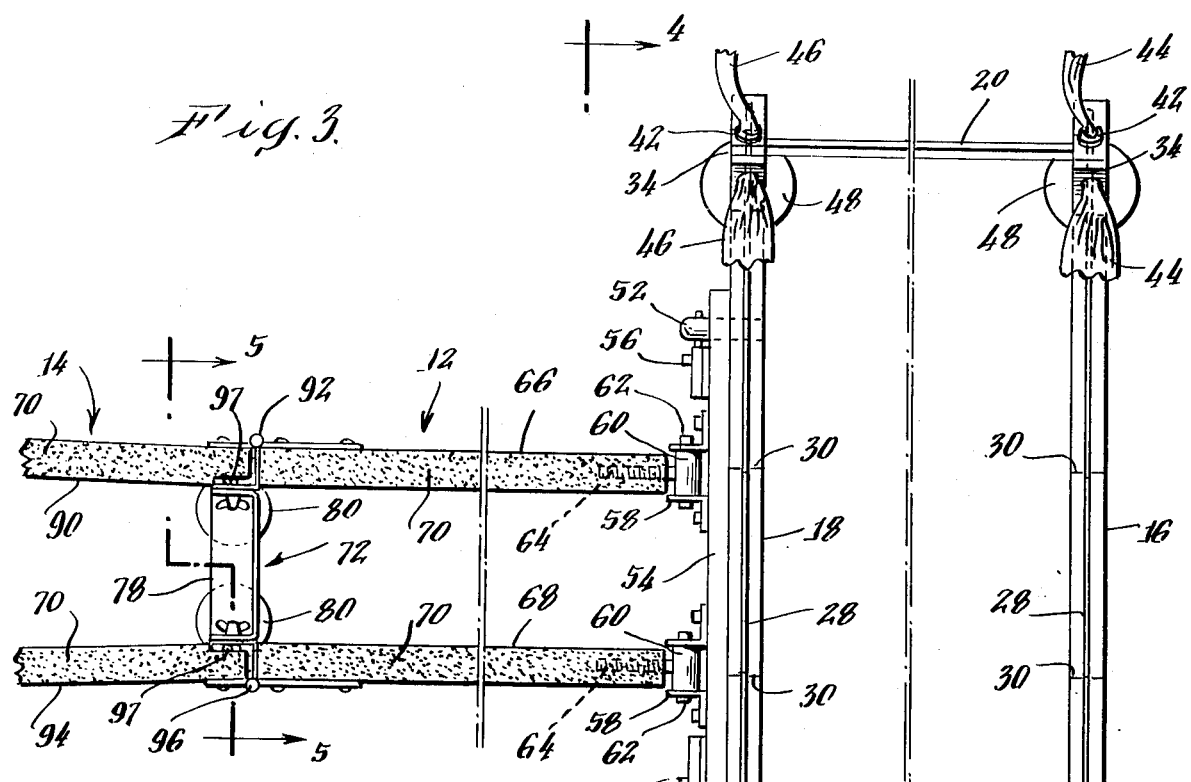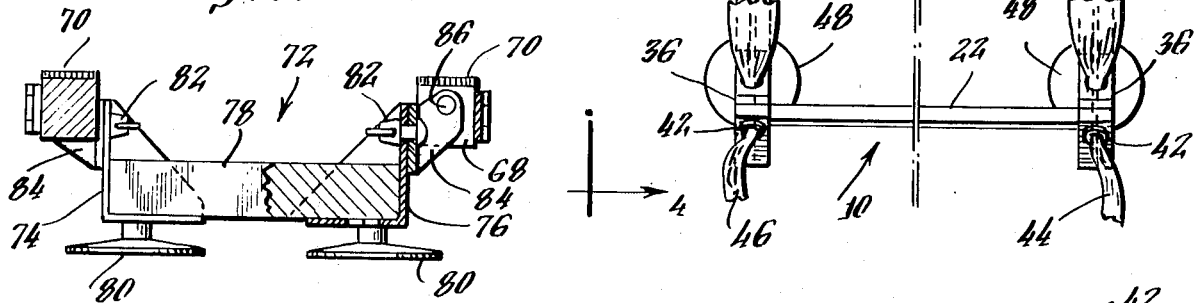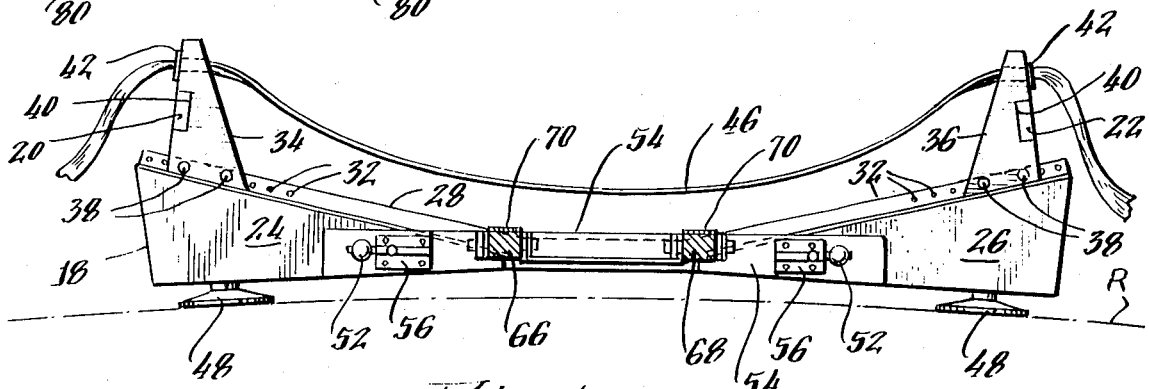

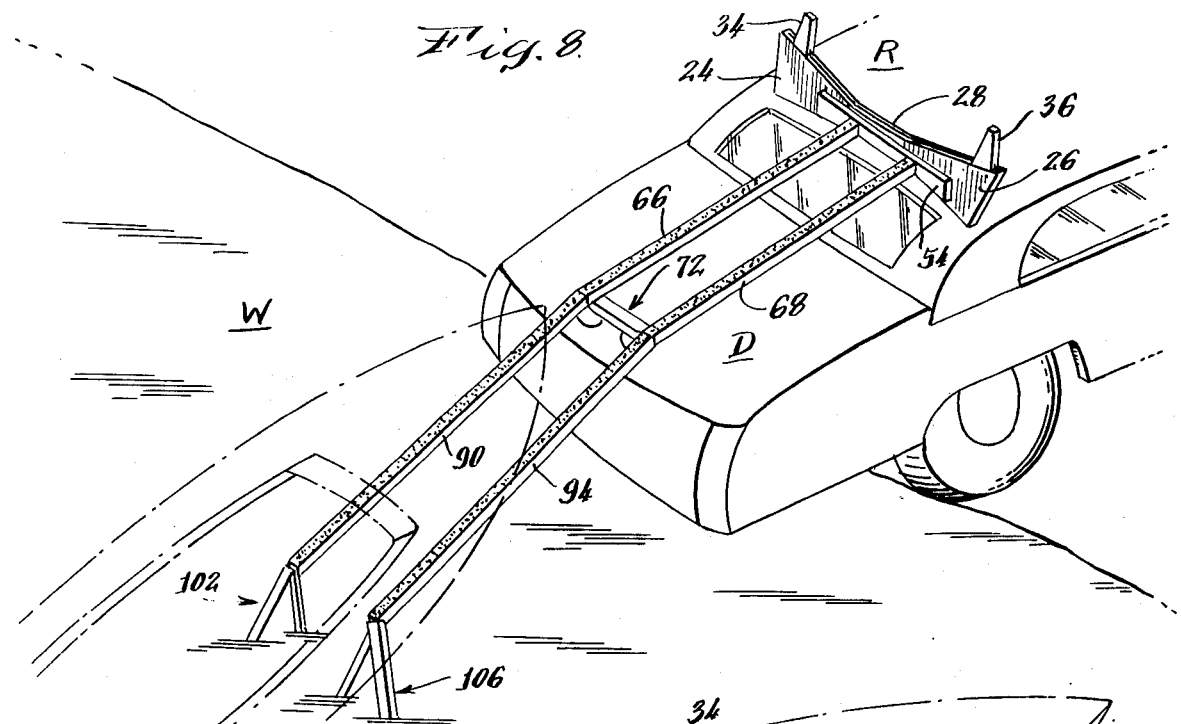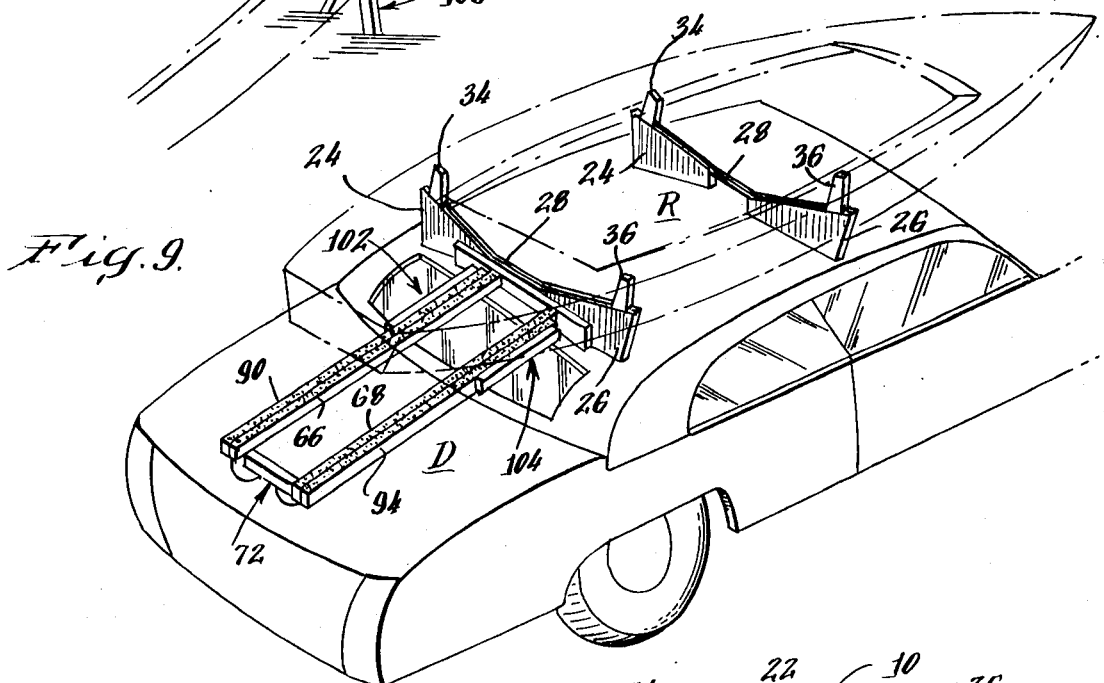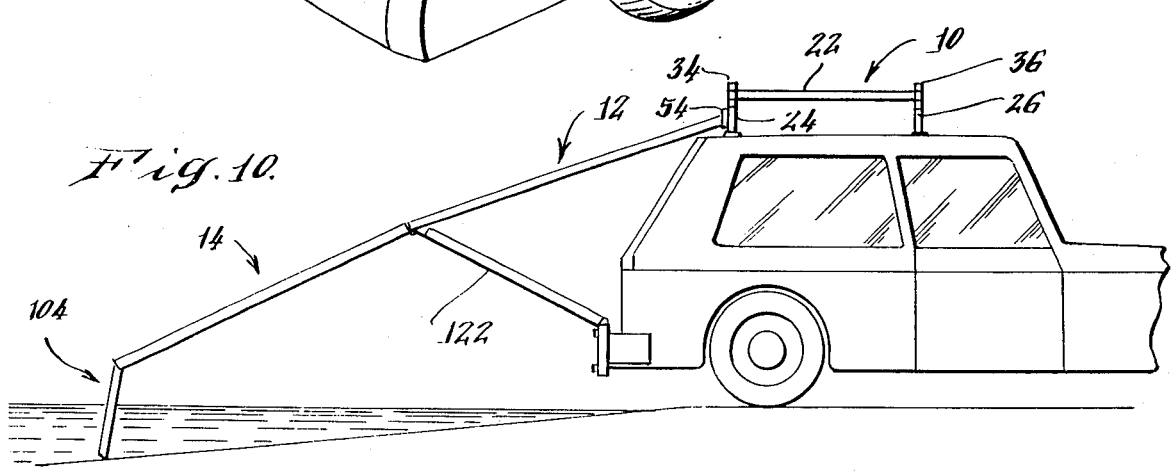

CAR TOP BOAT CARRIER

BACKGROUND OF THE INVENTION

This invention pertains to an easily mountable and demountable car top carrier for boats. A number of attempts have been made in the past to provide such devices. For example, a search through the United States patented art has disclosed the following relevant U.S. Pat. Nos. 2,247,128; 2,464,979; 2,765,940; 2,800,264; 3,128,893; 3,193,124; 3,460,693; 3,612,366; 3,734,322; 3,840,133. An analysis of the disclosures of the foregoing patents will indicate that none of them provide the combination of features most desired by the average small boat enthusiast. These would include, for example, light weight, simplicity of installation and removal from the car, an integral ramp easily storable for road transportation and adjustable for variations in bottom depth, and, ease of operation by one person for either loading or launching a boat. Accordingly, it is a primary object of the present invention to provide an apparatus having the aforementioned advantages. Other objects, features, and advantages will become apparent from the following description and appended claims.

SUMMARY OF THE INVENTION

A car top boat loader and carrier comprising a boat supporting cradle mountable on a car top, first and second elongated rail members having respective first and second ends, and means detachably securing the first ends of the rail members to the cradle in spaced relationship. Means are provided for supporting the second ends of the first and second rail members on the car spaced from the cradle with the first and second rail members being substantially parallel and defining a first ramp section. Third and fourth elongated rail members are hingedly secured to the respective second ends of the first and second rail members. Means are provided for individually supporting the second ends of the third and fourth rail members on the bottom of the body of water to compensate for variations in the depths of the bottom while forming a second ramp section aligned with the first ramp section.

BRIEF DESCRIPTION OF THE DRAWINGS

FIG. 1 is a plan view of a boat carrier in accordance with the invention shown mounted on a car top with the ramp portion extended for loading or launching;

FIG. 2 is a side view of the carrier of FIG. 1;

FIG. 3 is an enlarged partial plan view illustrating the construction in more detail;

FIG. 4 is a cross section taken substantially along the line 4—4 of FIG. 3;

FIG. 5 is a cross section taken substantially along the line 5—5 of FIG. 3;

FIG. 8 is a perspective view illustrating the manner in which a boat may be loaded on or launched from the carrier of the invention;

FIG. 9 is a view similar to FIG. 8 but showing the stowed boat and the folded ramp; and, FIG. 10 illustrates a modified form of the invention adapted for use with automobiles lacking a long rear deck.

DESCRIPTION OF THE PREFERRED EMBODIMENT

Figure 6:
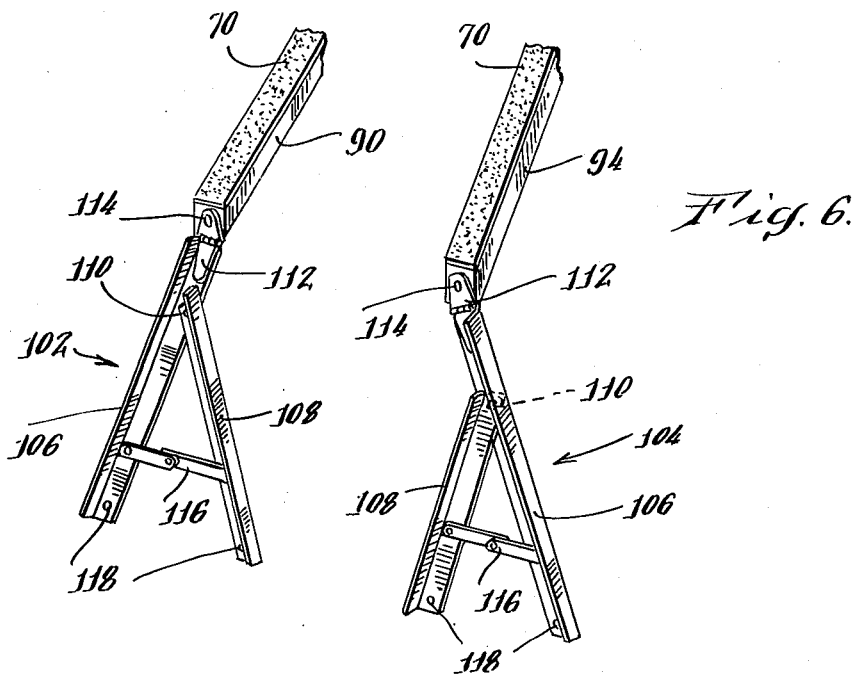
FIG. 6 is a perspective view of the ramp supports.

With particular reference to FIGS. 1 and 2, there is illustrated a carrier in accordance with this invention including a cradle 10 portion mounted on the roof R of an automobile. Secured to the cradle 10 is a fixed ramp 12 which inclines downwardly from the cradle 10 to the automobile rear deck D. A continuation of fixed ramp 12 is provided by a stowable ramp 14 which, in the illustrated configuration, is supported by the bottom B of a body of water W.

The construction of cradle 10 is illustrated in detail in FIGS. 3 and 4. It comprises a front sling support 16 and a rear sling support 18 which are of substantially identical construction and are joined by left 20 and righ 22 rail members. Each of the sling supports comprises a pair of left 24 and right 26 base members which may be of wood or other suitable material and are joined by a T iron 28 mounted with its web vertical as shown. The web of each T member is slit at two places 30 and the T member is bent at those places to take the form of a shallow U as shown in FIG. 4. The web of each T iron 28 is provided with a plurality of evenly spaced holes 32 extending inwardly from its ends for a preselected distance. Mounted on each of the T irons 28 is a left 34 and right 36 vertical support member. These members may also be of wood and are slotted to receive the web of the T iron 28 and are secured thereto by means of bolts 38, by means of which they may be spaced to conform to the width of the boat to be carried. Each of support members 34, 36 defines a notch 40 for receiving the ends of the rail members 20, 22. The upper end of each of the support members 34, 36 is drilled to receive a clamp 42. These may be, for example, of the type employed in securing flexible electrical cable and these engage and secure the ends of a front 44 and rear 46 sling. These slings may be of canvas or other suitable material and, as shown ins FIG. 4., are drawn sufficiently taut to hold the bottom of a supported boat above the car top. The front 16 and rear 18 sling supports are mounted to the car top be means of rubber suction cups 48 and are further secured by means of straps (FIG. 2) of a type conventionally used to secure luggage carriers to car tops. As previously explained, the front 16 and rear 18 sling supports are substantially identical. One important difference however is that the rear sling support 18 carries a pair of rearwardly extending short metal rods 52, one extending from each of the left 24 and right 26 base members and having a horizontal hole drilled therethrough.

Connected to the rear sling support 18 is the fixed ramp 12. It includes a forward cross member 54 adapted to lie flat against the planar surfaces of left and right base members 24, 26. It is drilled to receive the rods 52 and is secured in place by means of a pair of shot bolts 56 which enter the horizontal holes in the rods 52. Spaced brackets mounted on the cross member 54 form a pair of trunnions 58 which support a pair of rotatable sleeves 60 on hinge pins 62. Extending rearwardly from each of the sleeves 60 is a threaded shank 64, each of which enters the end of a left 66 and right 68 rail. The fit is sufficiently loose that the rails 66, 68 may rotate about each of the threaded shanks 64 to a limited extent. The rails 66, 68 are substantially rectangular in cross section and are covered on their upper surface by a suitable fabric or plastic coating 70 having low friction characteristics.

Figure 7:
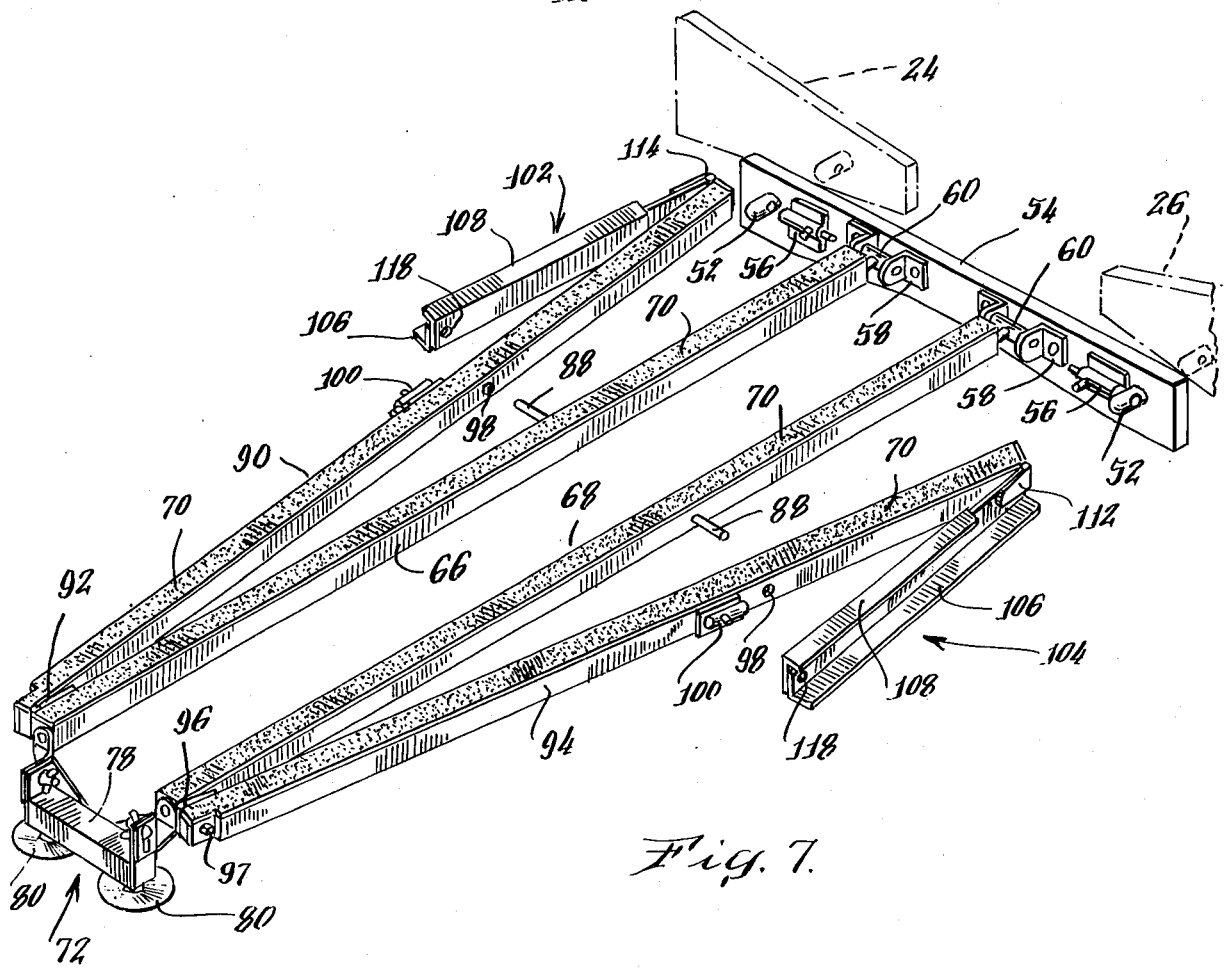
FIG. 7 is a perspective view illustrating the manner in which the ramp is secured to the car top carrier and the manner in which the ramp folds for storage.

The ends of the rails 66, 68 remote from the cradle 10 are supported in a rear deck mount 72. As will be seen most clearly in FIGS. 3 and 5, the mount 72 comprises a pair of metal brackets 74, 76 separated by a wooden stringer 78 and is mounted on the deck D of the car by means of suction cups 80. Mounted on the ends of the rear deck mount 72 by means of bolts and butterfly nuts 82 are a pair of angle clips 84. Each of the angle clips 84 tiltably supports one of the rails 66, 68 by means of a pivot pin 86 secured in the end of the rail and rotatably supported in the clip. It will thus be seen that the rails 66, 68 of the fixed ramp 12 are rotatable about their longitudinal axes. Each of the rails 66, 68 also carries a sidewardly extending locking stud 88 (FIG. 7). Near its ends, each of the pins 88 has a hole drilled therethrough parallel with its corresponding rail. These pins are employed for locking the ramp in a stored position as will be explained below.

The stowable ramp 14 comprises a left rail 90 connected end to end with rail 66 by means of a strap hinge 92 and a right rail 94 similarly connected to rail 68 by means of a strap hinge 96. Each of rails 90, 94 is pivotally connected to its respective strap hinge 92, 96 by means of a nut and bolt combination 97. The upper surfaces of these rails are also covered with a low friction coating 70 like that on rails 66, 68. Each of these rails has a horizontal hole 98 drilled therethrough in position to be aligned with and receive pins 88 when folded as shown in FIG. 7. On the side of each of rails 90, 94, and adjacent hole 98, is mounted a shot bolt 100.

Secured to the extremities of each of rails 90, 94 is a ground engaging foot assembly 102, 104. Each is formed of a main angle iron 106 and an auxiliary angle iron 108 connected thereto by a pivot pin 110. The upper end of each main angle iron is connected to its respective rail 90, 94 by means of a strap hinge 112 and pivot pin 114. The lower end of each main and auxiliary angle iron defines a hole 118. The main and auxiliary angle irons are interconnected by a pair of conventional hinge links 116.

FIG. 7 illustrates the manner in which the ramp assemblies of this invention may be folded into a compact configuration for storage either on or off the automobile. In so folding, the hinge links 116 of the foot assemblied 102, 104 illustrated in FIG. 6, are "broken" permitting the auxiliary angle irons 108 to fold inwardly against the main angle irons 106 with the respective holes 118 in the ends thereof being aligned. Thereafter, the assemblies are pivoted about the pivot pins 114 and folded directly back alongside the respective rails 90, 94. When so folded, the holes 118 are aligned with the holes 98 in the rails 90, 94. Thereafter, these rails are folded about their respective hinges 92, 96 to lie alongside the rail 66, 68. Upom being so folded, the holes 98, 118 engage the locking pins 88 and, when completely folded, are secured thereto by means of the shot bolts 100 being advanced to engage the matching holes in the locking pins 88.

To install the carrier of this invention, the cradle 10 is mounted on the car top as shown in FIGS. 1 and 2 and secured thereto be means of the straps 50 in a manner similar to that of securing conventional luggage racks. The left 34 and right 36 vertical support members are suitably positioned by means of the bolts 38 to match the size boat to be carried. Thereafter, the folded ramp assembly is mounted to the cradle as shown in FIG. 7 with cross member 54 being positioned against the base members 24, 26 with the rods 52 being received by the matching holes in the cross member. Securement is obtained by advancing the shot bolts 56 to engage the openings in the rods 52. The suction cups 80 are secured against the rear deck D of the automobile as shown in FIG. 2.

In order to load a boat onto the car top, each of the rails is unfolded in a reverse manner to that previously explained by retracting the bolts 100 and unfolding the rails 90, 94 to form approximate extensions of the rails 66, 68. The foot assemblies 102, 104 are similarly unfolded as shown in FIG. 6 and are positioned on the bottom of the body of water as shown in FIG. 2. The flexibility of the foot assemblies makes it possible to adjust them to compensate for variations in the bottom depth to thereby maintain the ends of the rails 90, 94 on a substantially common level. As shown in FIG. 1, a chain 120 may be installed to limit the spread between the rails 90, 94 but is not absolutely necessary. A person standing in the water may then load the boat onto the ramp by advancing it directly up the lower rails as shown in FIG. 8, permitting it to slide along the low friction coating 70 on the rails. An important feature of this invention resides in the fact that both upper and lower rails are rotatable in common about their longitudinal axes. These rails thereby automatically position themselves to conform to the bottom of the boat as it is being advanced. The boat is pushed along the stowable ramp 14 and the fixed ramp 12 until it rests in proper longitudinal position upon the cradle 10. Thereafter, the slings 44, 46 are tightened and secured by their respective clamps 42 to support the boat in position above the top of the automobile. The boat may thereafter be lashed to the cradle by means of conventional lashings.

A further feature of this invention will be noted in FIG. 4 and arises from the bends at 30 in each of the angle irons 28. These present a certain amount of natural resiliency which permits the cradle assembly to flex slightly under load thereby helping to absorb road shocks. After the boat is stowed, the rails may then be refolded into their stowed position for over the road transport. The boat is launched by simply reversing the sequence.

The foregoing has described the carrier of this invention as it would be attached to a conventional automobile having a relatively long rear deck. Some compact cars do not have such a rear deck and, accordingly, there is illustrated in FIG. 10 a slight modification wherein the rear deck mount 72 is replaced by a supporting strut assembly 122 mounted to the bumper of a compact car.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

I claim:

1. A car top boat carrier which comprises: a boat supporting cradle mountable on a car top; first and second elongated rail members having respective first and second ends; means for detachably securing the first ends of said first and second rail members to said cradle in spaced apart relationship; each of said first and second rail members being rotatable about its longitudinal axis means for supporting the second ends of said first and second rail members, said first and second rail members being substantially parallel and defining a first ramp section; third and fourth elongated rail members having respective first and second ends, the first ends being hingedly secured to the respective second ends of said first and second rail members; and means for individually supporting the second ends of said third and fourth rail members on the bottom of a body of water to compensate for variations in the depth of said bottom and form a second ramp section aligned with the first ramp section.

2. The carrier of claim 1 wherein said detachable securing means comprises: a cross member; first and second hinge means on said cross member, each secured to the first end of the respective first and second rail members; and means for clampingly engaging said cross member to said cradle.

3. The carrier of claim 1 wherein the means for supporting the second ends of the first and second rail members comprises: a base member mountable on a part of a car distant from its top; and pivot means on said base member supporting said second ends in spaced apart relationship for individual rotation of said first and second rail members about their longitudinal axes.

4. The carrier of claim 3 wherein each of said third and fourth rail members is non-rotatable relative to its associated first or second rail member.

5. The carrier of claim 1 wherein said individual supporting means comprises: a foldable foot assembly pivotally and hingedly secured to the second end of each of said third and fourth rail members.

6. The carrier of claim 5 wherein each of said third and fourth rail members is foldable into a storage position alongside its respective first or second rail member and each of said foot assemblies is foldable into a storage position alongside its respective third or fourth rail member.

7. The carrier of claim 1 wherein said cradle comprises: a forward sling support including a pair of horizontally spaced vertical support members; a rear sling support including a pair of horizontally spaced vertical support members; an elongated, flexible, forward boat support sling extending between the vertical support members of said forward sling support; an elongated, flexible, rear boat support sling extending between the vertical support members of said rear sling support; and means for selectively adjusting the tension of each of said front and rear boat support slings.

8. The carrier of claim 7 wherein said detachable securing means comprises: a cross member; first and second hinge means on said cross member, each secured to the first end of the respective first and second rail members; and means for clampingly engaging said cross member to said cradle.

* * * * *